Patented Apr. 26, 1927.

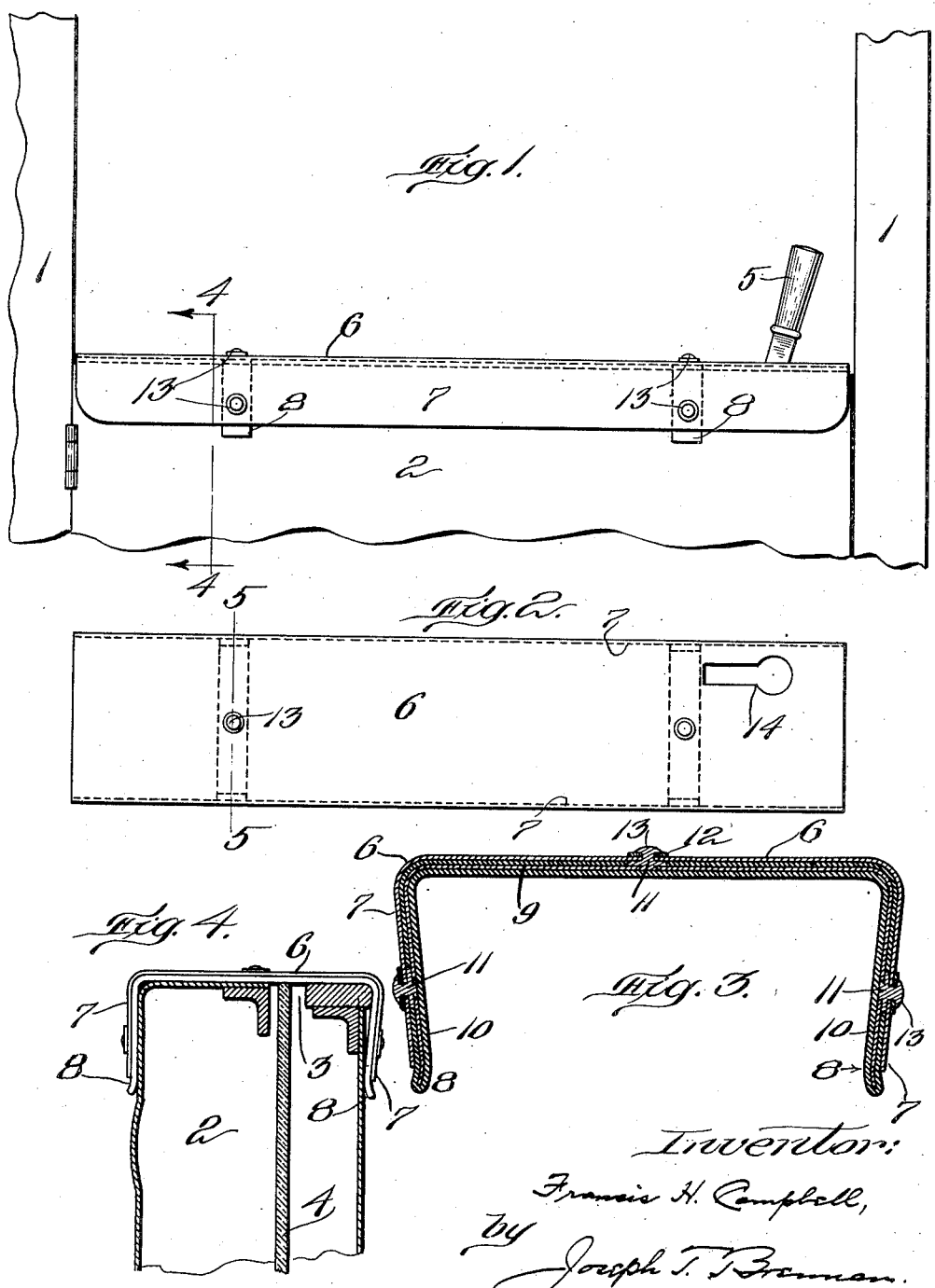

1,625,791

UNITED STATES PATENT OFFICE.

FRANCIS H. CAMPBELL, OF BRIGHTON, MASSACHUSETTS.

SHIELD ATTACHMENT FOR AUTOMOBILE DOORS.

Application filed August 8, 1925. Serial No. 48,989.

My invention relates to shield attachments for application to the bodies of automobiles.

The bodies of automobiles are painted and varnished or otherwise given a highly polished finish coating which is easily scratched worn or otherwise marred. Under ordinary use the outside of the body will remain in good condition and preserve its good appearance for a long while with the exception of the top and upper portion of the doors and sides which are handled by the passengers of the car and used as arm rests by those seated within the car. Probably the top portion of the door or doors of the car receive the hardest usage as this portion is invariably grasped, in lieu of the door handle in opening and closing said door. As a result, even with a new car it is not very long before the top portions of the sides and doors of a car become marred and unsightly through finger prints, scratches and wear. My invention aims to provide a shield attachment for the upper portion of the side or door of an automobile which, when placed in position upon a door or side that is not already disfigured, will protect the same from injury, or when placed in position upon an old door or side, will cover up the disfigurations and improve the appearance of the car.

In automobiles of that class having its door or side made with a glass panel that is raised and lowered, said panel is supported within a slot at the top of the door or side with provision for vertical movement, said side or door being made hollow and receiving the panel when the latter is lowered. This slot is invariably considerably wider than the thickness of the glass panel and as a result dust and dirt pass down through it into the hollow side or door and lodges upon the glass panel so that the latter has to be cleaned frequently. It will therefore be clear that my attachment, when in position upon the door or side may also serve as a closure for the slot thus excluding dirt and dust from the interior of the door or side.

Other features of my invention are hereinafter pointed out.

In the accompanying drawings:

Figure 1 is a side view of a portion of the body of an automobile showing an attachment, constructed in accordance with my invention, applied to the door of the vehicle;

Figure 2 is a plan view of the attachment shown in Figure 1;

Figure 3 is a section, enlarged, on line 3—3 of Figure 2;

Figure 4 is an enlarged section on line 4—4 of Figure 1.

Having reference to the drawings, 1, 1 represent portions of the body of an automobile of the coupe model and 2 the door thereof through which access is had to the interior of the vehicle. The door 2, as well as each side wall, of an automobile of this model, is made hollow, as shown in Figure 4, and formed at its top with a slot 3 within which is arranged a glass panel 4 that is raised and lowered by manually operated means, not shown. Such a door is usually constructed with a latch for holding it in closed position, said latch including an operating handle 5 projecting upwardly through a slot, not shown, in the top of the door.

As shown in Figures 2 and 3, my new attachment comprises a cover member 6 which is preferably made from a piece of sheet celluloid, although any other suitable sheet material may be employed. This member is made of the same width and length as the top edge of the door and is preferably formed upon each side of its middle body portion with depending side flaps 7, 7 disposed close alongside of the outer and inner sides of the door, respectively. Thus the member 6 covers the top of the door and also the upper portions of the outer and inner surfaces thereof, being preferably molded so that it is U-shaped in cross section. When so shaped it may, if desired, be applied to the door, or side of the vehicle, simply by forcing, or springing it onto the same where it is held by its own clamping or gripping action. I prefer, however, to construct the attachment with spring grips 8, 8 herein shown as the ends of U-shaped spring metal strips 9 arranged within the cover member 6, and each provided with a covering 10 of rubber or other suitable soft material.

Each strip 9 is made with three studs 11 projecting outwardly therefrom through the celluloid cover 6 and washers 12, the outer ends of said studs being headed or upset as at 13 whereby the parts are securely fastened together. The grips 8 are normally bent inwardly slightly as shown in Figure 3 so that when the attachment is forced into position upon the upper end of the door they are sprung apart with the metal strips under tension so that the attachment holds itself in position upon the door.

The body member 6 is formed with a button-hole slot 14 through which the latch handle 5 extends, the larger end of said slot serving as a passage for said handle when applying or removing the attachment.

Of course, when the glass panel is to be raised the attachment is removed from the door and stowed away within the locker of the vehicle.

The body member 6 may be made of celluloid having any desired color and when in position will have an ornamental effect, even in the case of a new vehicle, and particularly in the case of a vehicle whose door has been disfigured. Furthermore, the celluloid cover will not show finger marks as will the highly finished surface of the car itself. It will be clear also, that the cover 6 in addition to serving as a closure for slot 3, serves also as a shield to prevent wear of the upper portion of the door and injury to the door through being scratched by coat sleeve buttons, cuff buttons, finger rings and the like.

What I claim is:

1. An attachment shield of the character described comprising, in combination, a sheet of celluloid formed in channel-bar shape and adapted to be slipped over the top edge of an automobile door or the like to protect said top edge and the sides of the door adjacent thereto; a plurality of U-shaped spring strips arranged transversely on the inner side of said celluloid sheet for clamping said shield to the door; cushioning material covering said spring strips and fastening means binding said sheet and spring strips together.

2. An attachment shield of the character described comprising, in combination, a sheet of celluloid formed in channel-bar shape and adapted to be slipped over the top edge of an automobile door or the like to protect said top edge and the sides of the door adjacent thereto; a plurality of U-shaped spring strips arranged transversely on the inner side of said celluloid sheet for clamping said shield to the door; cushioning material covering said spring strips and fastening means binding said sheet and spring strips together; said celluloid sheet having an opening therein to accommodate the door handle.

Signed at Boston, Massachusetts, this 17th day of July, 1925.

FRANCIS H. CAMPBELL.